US012021554B2

(12) United States Patent
Israel et al.

(10) Patent No.: US 12,021,554 B2
(45) Date of Patent: Jun. 25, 2024

(54) MITIGATING RECEIVER OSCILLATOR LEAKAGE BETWEEN COEXISTING WIRELESS TECHNOLOGIES

(71) Applicant: Intel Corporation, Santa Clara, CA (US)

(72) Inventors: Amichay Israel, Haifa (IL); Daniel Cohn, Raanana (IL); Oz Shalev, Hogla (IL)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 17/125,278

(22) Filed: Dec. 17, 2020

(65) Prior Publication Data
US 2021/0105031 A1 Apr. 8, 2021

(51) Int. Cl.
*H04B 1/04* (2006.01)
*H04B 1/00* (2006.01)
*H04W 88/06* (2009.01)

(52) U.S. Cl.
CPC ......... *H04B 1/0475* (2013.01); *H04B 1/0082* (2013.01); *H04B 1/0483* (2013.01); *H04W 88/06* (2013.01)

(58) Field of Classification Search
CPC .. H04B 1/0475; H04B 1/0082; H04B 1/0483; H04B 1/0057; H04B 1/48; H04W 88/06; H04W 84/12
See application file for complete search history.

(56) References Cited

U.S. PATENT DOCUMENTS

| 9,197,278 B2* | 11/2015 | Haralabidis | H04B 1/005 |
| 2016/0234748 A1* | 8/2016 | Chrisikos | H04L 43/065 |
| 2018/0048339 A1* | 2/2018 | Wu | H04B 1/1018 |
| 2022/0299621 A1* | 9/2022 | Werner | G01S 13/765 |

* cited by examiner

*Primary Examiner* — Dac V Ha
(74) *Attorney, Agent, or Firm* — Schwegman Lundberg & Woessner, P.A.

(57) ABSTRACT

Techniques for mitigating interference between coexisting Bluetooth baseband processing circuitry and Wireless Local Area Network (WLAN) baseband processing circuitry are disclosed. In some implementations, an oscillator control circuit may determine a first operating frequency associated with the WLAN baseband processing circuitry. The oscillator control circuit may determine a second operating frequency associated with the Bluetooth baseband processing circuitry. The oscillator control circuit may detect overlap between the first operating frequency and the second operating frequency. The oscillator control circuit may adjust an oscillator sideband for an oscillator of the Bluetooth baseband processing circuitry based on the detected overlap to mitigate interference between signals generated by the oscillator of the Bluetooth baseband processing circuitry and the first operating frequency associated with the WLAN baseband processing circuitry.

20 Claims, 8 Drawing Sheets

MITIGATING RECEIVER OSCILLATOR LEAKAGE BETWEEN COEXISTING WIRELESS TECHNOLOGIES

TECHNICAL FIELD

Various embodiments generally may relate to the field of radio frequency (RF) signal transmission and reception using coexisting wireless technologies, and mitigating receiver oscillator leakage between such coexisting technologies in a wireless device.

BACKGROUND

The use of wireless connectivity using different coexisting technologies has been increasingly popular in computing devices based on the flexibility and convenience in connectivity they provide. Bluetooth (BT) technology provides short distance wireless links that allow connectivity within a 10-meter range. In contrast, Wireless Local Area Networks (WLANs) provide connectivity to devices that are located within a larger geographical area, such as the area covered by a building or a campus. WLAN systems (also referred to as Wi-Fi systems) are based on IEEE 802.11 standard specifications and typically operate within a 100-meter range. However, when operating a Bluetooth radio and a WLAN radio that are co-located in a wireless device, coexisting technology scan activity (e.g., BT low energy (BLE) scans) may interfere with Wi-Fi reception on the same radio.

BRIEF DESCRIPTION OF THE DRAWINGS

In the drawings, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Techniques disclosed herein can be used to perform mitigation of interference between coexisting wireless technologies (e.g., coexisting BT and WLAN physical layer (PHY) circuitry including BT baseband processing circuitry and WLAN baseband processing circuitry) caused by local oscillator (LO) leakage. More specifically, the LO of the BT baseband processing circuitry may emit signals that fall within an operating frequency range of the WLAN baseband processing circuitry. Disclosed techniques are used to detect the operating frequency of the BT baseband processing circuitry (e.g., BT LO frequency used when the BT baseband processing circuitry is receiving signals) and operating frequency of the WLAN baseband processing circuitry (e.g., WLAN LO frequency used when the W LAN processing circuitry is receiving signals simultaneously with the BT baseband processing circuitry). When there is an overlap detected between the operating frequencies of the BT baseband processing circuitry and the WLAN baseband processing circuitry, an oscillator control command is generated to switch between operation on high sideband and low sideband for the BT LO.

Figure 1:
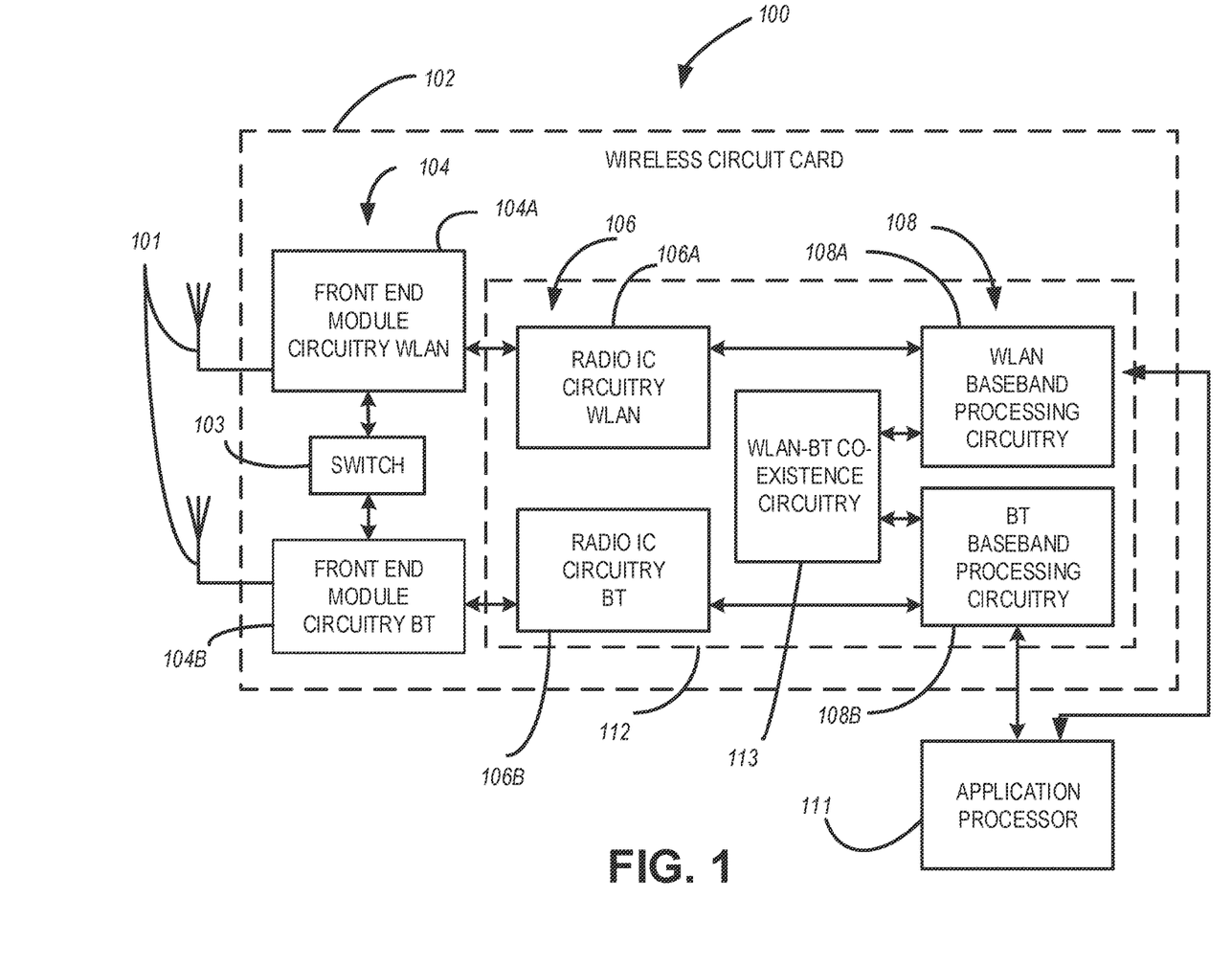
FIG. 1 is a block diagram of a radio architecture, in accordance with some embodiments.

FIG. 1 is a block diagram of a radio architecture 100 in accordance with some embodiments. The radio architecture 100 may be implemented in a computing device including user equipment (UE), a base station (e.g., a next generation Node-B (gNB), enhanced Node-B (eNB)), a smartphone, or another type of wired or wireless device using synthesizer circuitry with frequency estimation. The radio architecture 100 may include radio front-end module (FEM) circuitry 104, radio IC circuitry 106, and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals, and to provide the amplified versions of the received signals to the WLAN radio IC circuitry 106A for further processing. The BT FEM circuitry 104B may include a receive signal path which may include circuitry configured to operate on BT RF signals received from the one or more antennas 101, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by the one or more antennas 101. Besides, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio TC circuitries where at least some of the radio IC circuitries share transmit and/or receive signal paths for both WLAN and BT signals.

In some aspects, the radio IC circuitry 106 (e.g., the WLAN radio IC circuitry 106A and the BT radio IC circuitry 106B) uses synthesizer circuitry (e.g., synthesizer circuitry illustrated in FIG. 3 or a digital frequency synthesizer illustrated in FIG. 5) using one or more of the disclosed techniques for frequency estimation.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WLAN baseband processing circuitry 108A and the BT baseband processing circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and the baseband processing circuitry 108 may be provided on a single radio card, such as wireless radio card 102. In some other embodiments, the one or more antennas 101, the FEM circuitry 104, and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC.

In some of these multicarrier embodiments, radio architecture 100 may be part of a Wi-Fi communication station (STA) such as a wireless access point (AP), a base station, or a mobile device including a Wi-Fi enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11 ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards, including a $3^{rd}$ Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.1 lax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the single wireless radio card 102, although embodiments are not so limited, and include within their scope discrete WLAN and BT radio cards In some embodiments, the radio architecture 100 may include other radio cards, such as a cellular radio card configured for cellular (e.g., 3GPP such as LTE, LTE-Advanced, or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 2:
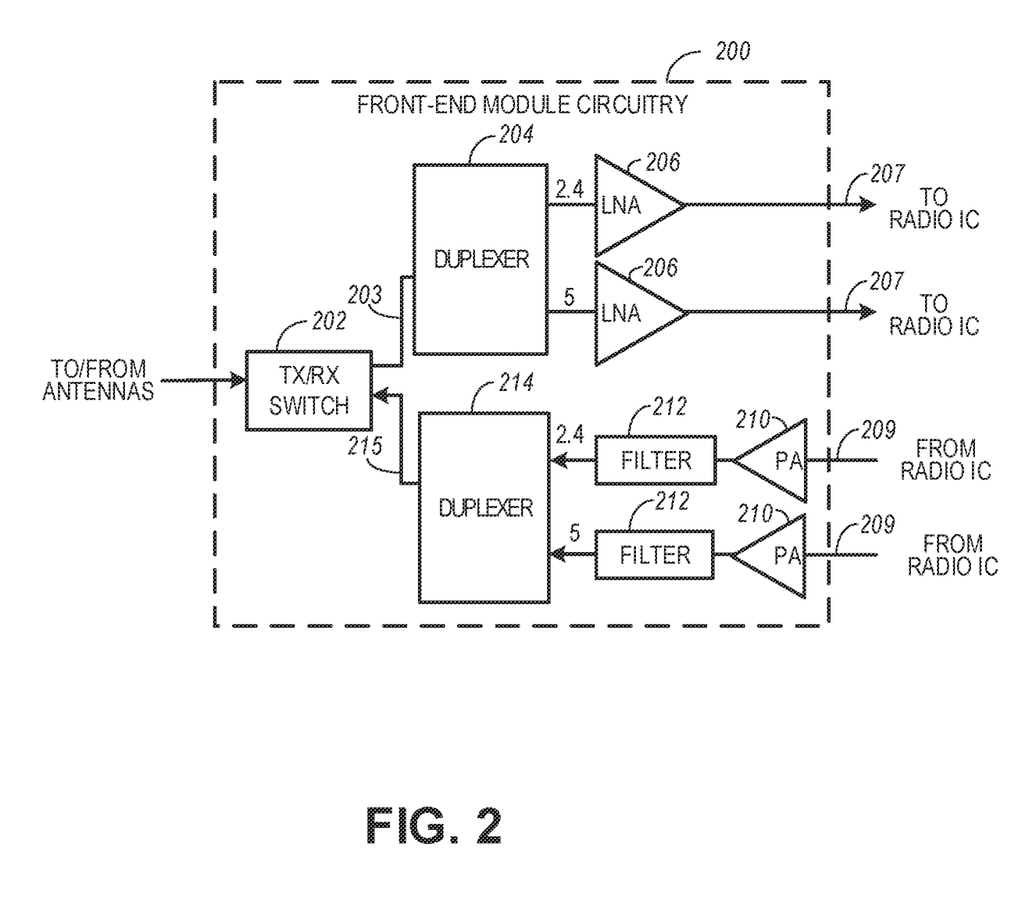
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit (TX) mode and receive (RX) mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

Figure 3:
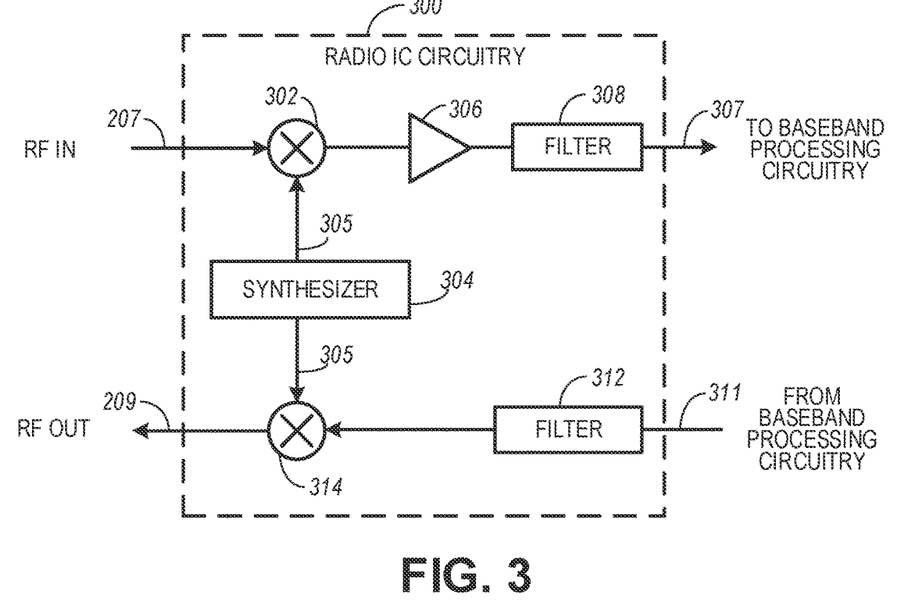
FIG. 3 illustrates a radio IC circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 uses one or more of the disclosed techniques for frequency estimation (e.g., the frequency estimation techniques discussed in connection with FIGS. 5-12). In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry, such as the digital frequency synthesizer using the disclosed techniques and discussed in connection with FIG. 5. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
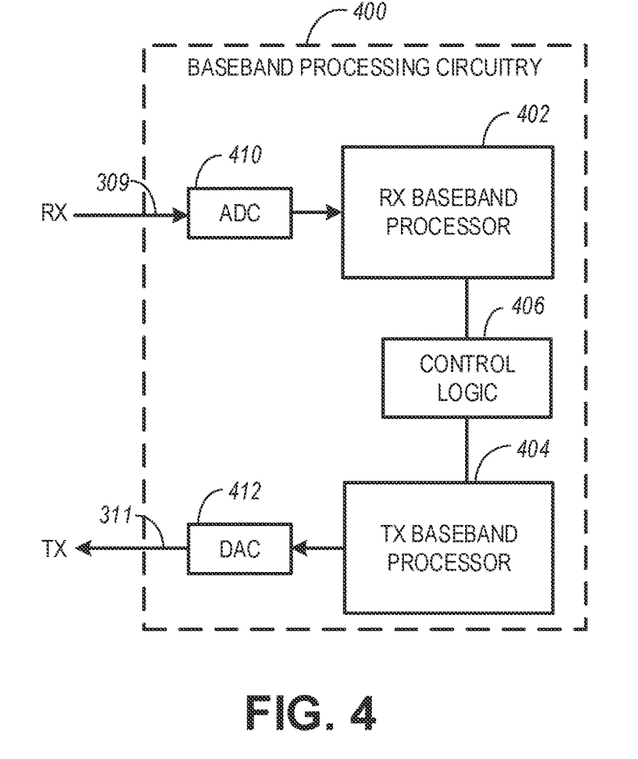
FIG. 4 illustrates a baseband processing circuitry for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through the baseband processing circuitry 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Figure 6:
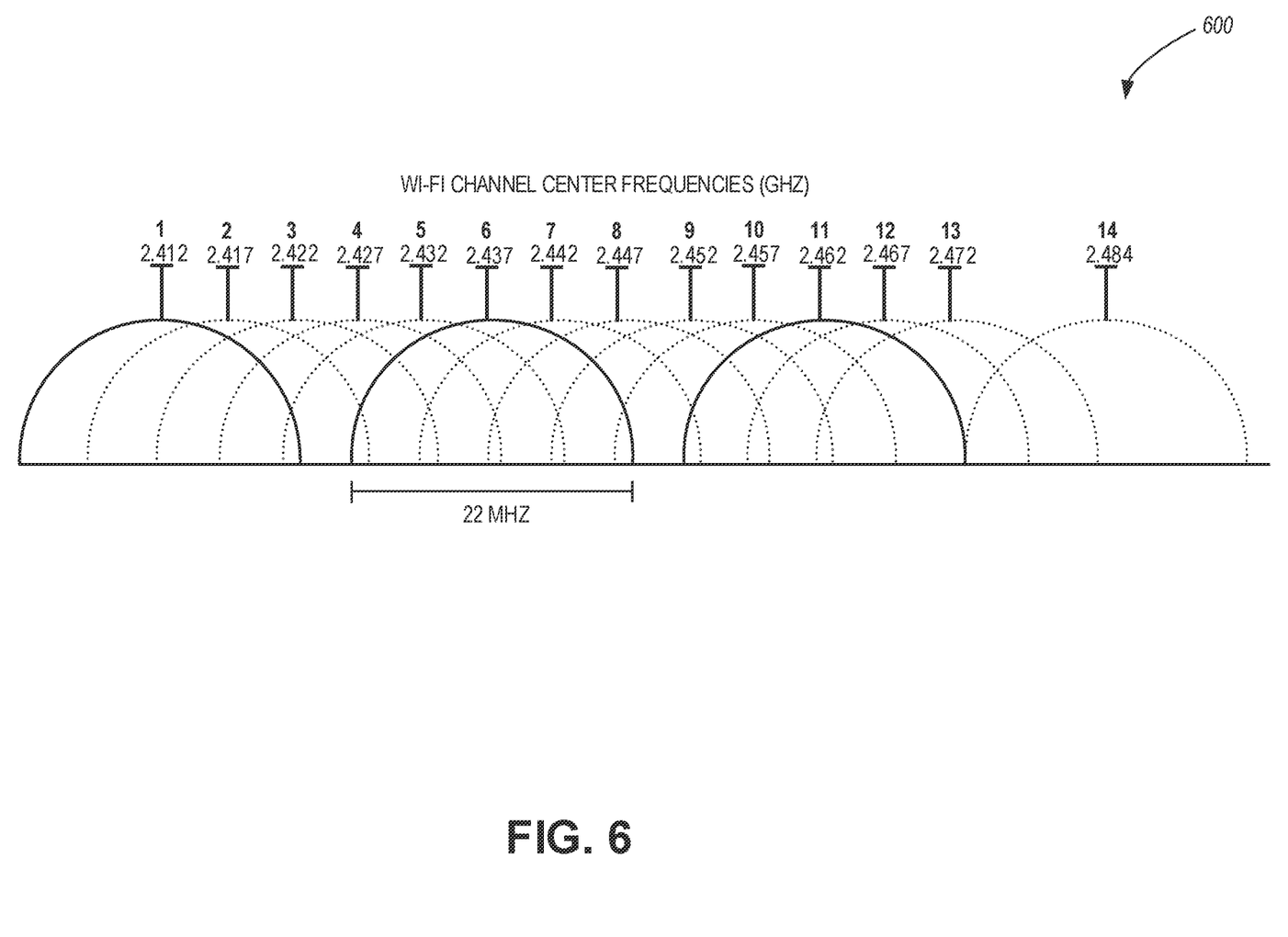
FIG. 6 illustrates a diagram of Wi-Fi frequency channels associated with the disclosed interference mitigation techniques, in accordance with some embodiments.
Figure 7:
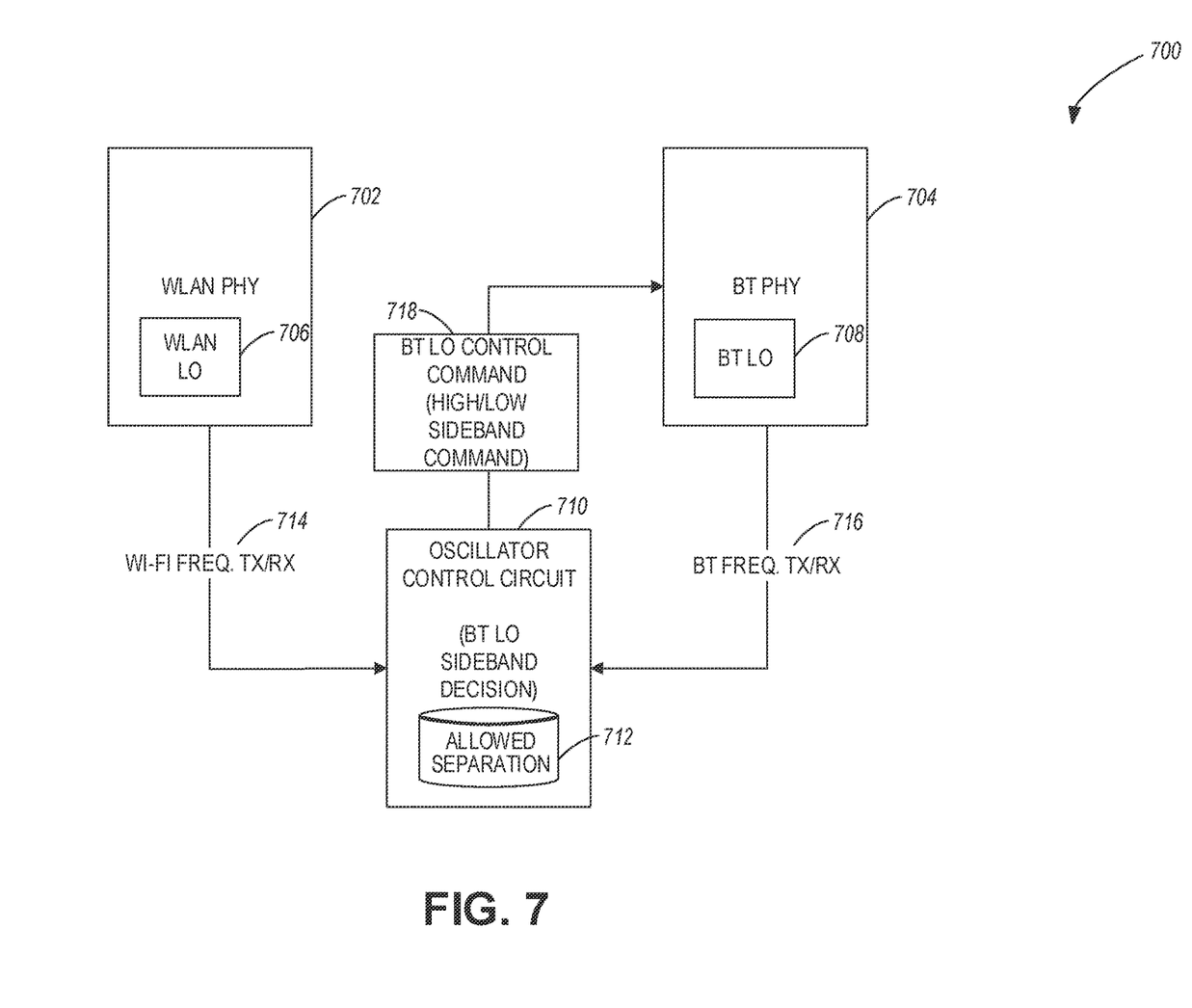
FIG. 7 illustrates a schematic diagram of example baseband processing circuitry with BT-WLAN coexistence using an oscillator control logic to mitigate oscillator leakage, in accordance with some embodiments.

In some aspects, the baseband processing circuitry 400 (which may include the coexisting WLAN baseband processing circuitry 108A and BT baseband processing circuitry 108B) may include oscillator control functionalities (e.g., as performed by an oscillator control circuit such as the oscillator control circuit 710 in FIG. 7) to mitigate BT-Wi-Fi interference due to oscillator leakage (e.g., leakage caused by the BT oscillator into the Wi-Fi channels). The oscillator control circuit may include suitable circuitry, logic, interfaces, and/or code and is configured to perform one or more of the interference mitigation functionalities discussed in connection with FIG. 5-FIG. 9.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The disclosed techniques for mitigating interference in devices with coexisting technology (e.g., coexisting BT and WLAN circuits) include swapping of the coexisting technology (e.g. BT) receive (RX) local oscillator (LO) upper or lower sidebands according to the frequency separation between Wi-Fi and coexisting technology (e.g., BT) to avoid oscillator leakage into the Wi-Fi channel. The disclosed techniques allow coexisting technology scans (e.g., BT Low Energy (BLE) scans) in parallel to Wi-Fi reception with mitigated interference and minimal impact on the Wi-Fi circuit's performance.

In some aspects, Swift Pair technology may be enabled (e.g., in a Windows 10 operating system (OS)) and the Rx LO leakage on the BT antenna may be measured via a spectrum analyzer. Using the disclosed techniques, the BT operating frequency and the WLAN operating frequency are determined, while the BT receiver is scanning BLE advertising channels and the WLAN receiver is operating on a Wi-Fi channel. Upon detecting an overlap between the operating frequencies, the BT LO may be adjusted from operating at a high sideband to operating at a low sideband. In some aspects, the high sideband may be 1 MHz higher than the center operating frequency of the BT receiver, and the low sideband may be 1 MHz lower than the center operating frequency of the BT receiver. Upon detecting that no overlap exists between the BT and WLAN operating frequencies, the BT LO may be adjusted from operating at the low sideband to operating at the high sideband associated with the operating frequency of the BT baseband processing circuitry.

Introduced in Windows 10 (version 1803), Swift Pair is a way to pair Bluetooth peripherals to Windows 10 devices. As the next evolution of pairing, users no longer need to navigate the Settings App on a device to find their BT peripheral to pair with. Windows Swift Pair can now perform this functionality by popping a notification when a new peripheral is nearby and ready for pairing. The discovery of Swift Pair peripherals takes place over the Bluetooth Low Energy (BLE) protocol and requires the use of low energy (LE) advertisements. The Windows operating system uses the advertisements to identify a peripheral as Swift Pair capable.

For the Windows operating system to identify a peripheral shortly after it enters pairing mode, peripherals beacon for Swift Pair at a faster cadence than normal for quick discovery. The faster a peripheral advertises, the less time Windows needs to listen, which improves BT and Wi-Fi coexistence on the same radio. After a short period, the peripheral can fall back to a lower but consistent advertising cadence. In some aspects, for quickest discovery, beacon consistently every 30 ms for >=30 seconds is used and then fall back to a normal cadence is used. In some aspects, for normal cadence, beacon consistently every 100 ms or 152.5 ms is used during a Swift Pair session.

Continuously monitoring BLE advertisements may cause some radios to improperly handle Wi-Fi activity when on the same radio due to BT LO leakage in overlapping operating frequencies. For example, significant degradation in signal reception may occur while using Wi-Fi Channel 1 (at 2412 MHz) while BLE advertisement reception takes place.

Figure 5:
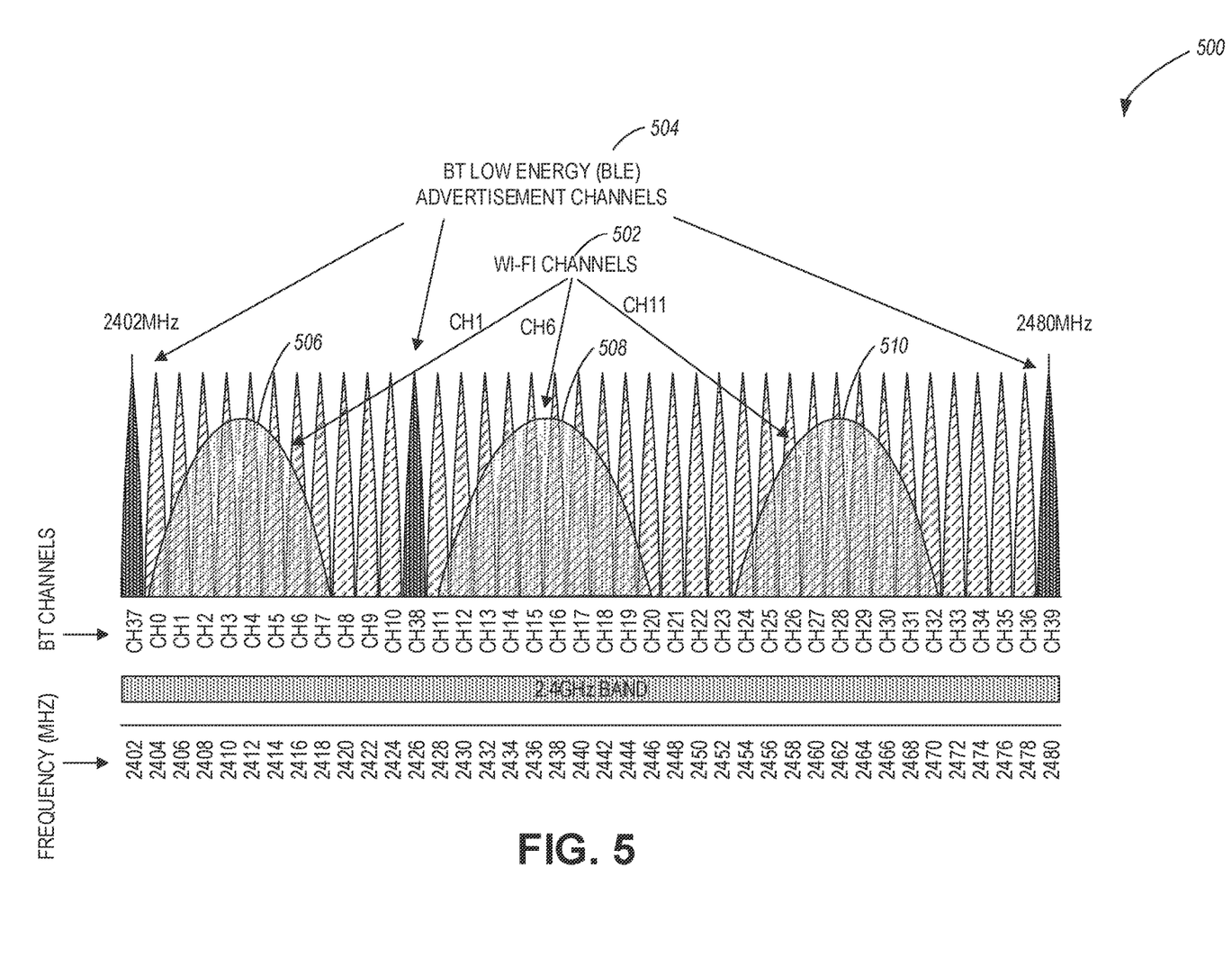
FIG. 5 illustrates a diagram of BT and Wi-Fi frequency channels associated with the disclosed interference mitigation techniques, in accordance with some embodiments.

In some aspects, coexisting Wi-Fi and BT circuitry share the same processing chain, allows both processing cores to receive signals in parallel. For example, a BLE scan is performed in parallel to Wi-Fi reception. However, BT Rx local oscillator leakage may cause Wi-Fi signal reception false alarm while the BT circuitry is scanning at Channel 37 (2402 MHz). The BT Rx is operating using low-IF, which means that while BT circuitry is receiving signals at Channel 37, the BT LO is operating at the upper sideband (namely, 2403 MHz) which falls within the frequency range of Wi-Fi Channel 1. The disclosed techniques may be used to mitigate interference caused by the BT LO in coexisting Wi-Fi and BT circuitry FIG. 5 illustrates diagram 500 of BT and Wi-Fi frequency channels associated with the disclosed interference mitigation techniques, in accordance with some embodiments. More specifically, FIG. 5 illustrates BT frequency channels in the 2.4 GHz band, including Channel 0 (CH0) through CH39. BT circuitry can be configured to operate according to a BT LE functionality such as Swift Pair which uses BLE advertisement channels 504. The BLE advertisement channels 504 can include CH 37 at 2402 MHz, CH 38 and 2426

MHz, and CH 39 at 2480 MHz. FIG. 5 further illustrates Wi-Fi channels 502 which may also fall in the 2.4 GHz band used by the BT frequency channels. More specifically, FIG. 5 illustrates Wi-Fi CH1 506 centered at 2412 MHz, Wi-Fi CH6 508 centered at 2437 MHz, and Wi-Fi CH11 centered at 2462 MHz (the full spectrum of Wi-Fi channels is illustrated in FIG. 6).

FIG. 6 illustrates diagram 600 of Wi-Fi frequency channels associated with the disclosed interference mitigation techniques, in accordance with some embodiments. Even though FIG. 6 illustrates Wi-Fi channels associated with 22 MHz bandwidth, the disclosure is not limited in this regard and Wi-Fi channels with other bandwidths may also be used.

In aspects when coexisting BT circuitry operates on the advertisement channels 504, BT LO leakage may cause interference on one or more of the Wi-Fi channels 502. In this case, as discussed in connection with FIG. 7, the operating sideband of the BT LO may be switched from a high sideband to a low sideband when there is frequency overlap between the BT and WLAN operating frequencies, or switched from a low sideband to a high sideband when there is no frequency overlap.

FIG. 7 illustrates a schematic diagram 700 of example baseband processing circuitry with BT-WLAN coexistence using an oscillator control logic to mitigate oscillator leakage, in accordance with some embodiments. Referring to FIG. 7, the illustrated coexisting circuitry includes WLAN PHY 702 and BT PHY 704, which can be associated with the wireless circuit card 100 in FIG. 1 or another wireless device. In some aspects, the WLAN PHY 702 and the BT PHY 704 can include the WLAN baseband processing circuitry 108A and the BT baseband processing circuitry 108B respectively. The WLAN PHY 702 includes a WLAN LO 706 and the BT PHY 704 includes a BT LO 708.

The WLAN PHY 702 and the BT PHY 704 are further configured to use an oscillator control circuit 710 in connection with interference mitigation functionalities discussed herein. The oscillator control circuit 710 include suitable circuitry, interfaces, logic, and/or code and is configured to generate an oscillator control command 718 to adjust the sideband BT LO 708 is operating on (e.g., switch from a high sideband to a low sideband when interference between the WLAN and BT operating frequencies is detected or a switch from a low sideband to a high sideband when no interference is detected). The oscillator control circuit 710 can be implemented as hardware or firmware within the wireless circuit card 100, within the WLAN baseband processing circuitry 108A, BT baseband processing circuitry 108B, the WLAN-BT coexistence circuitry 113, or other circuitry within the wireless circuit card 100.

In an example embodiment, the oscillator control circuit 710 receives (or detects) the current Wi-Fi operating frequency 714 used for transmitting or receiving signals by the WLAN PHY 702, as well as the current BT operating frequency 716 used for transmitting or receiving signals by the BT PHY 704. The oscillator control circuit 710 determines whether there is an overlap between the WLAN and BT operating frequencies. The oscillator control circuit 710 further includes allowed separation information 712 which indicates allowed overlap between different WLAN and BT operating frequencies. In aspects when the determined overlap is higher than the allowed overlap, the oscillator control circuit 710 generates the BT LO control command 718 which is communicated to the BT PHY 704 and is used for adjusting the operating sideband of the BT LO 708 from a high sideband to a low sideband. For example, if the Wi-Fi operating frequency 714 is CH1 (centered at 2412 MHz) and the BT operating frequency is BLE advertising CH37 (centered at 2402 MHz), the BT LO is switched from operating at high sideband at 2403 MHz (which interference with the Wi-Fi CH1) to operate at a low sideband of 2401 MHz (which does not interfere with Wi-Fi CH1)

Figure 8:
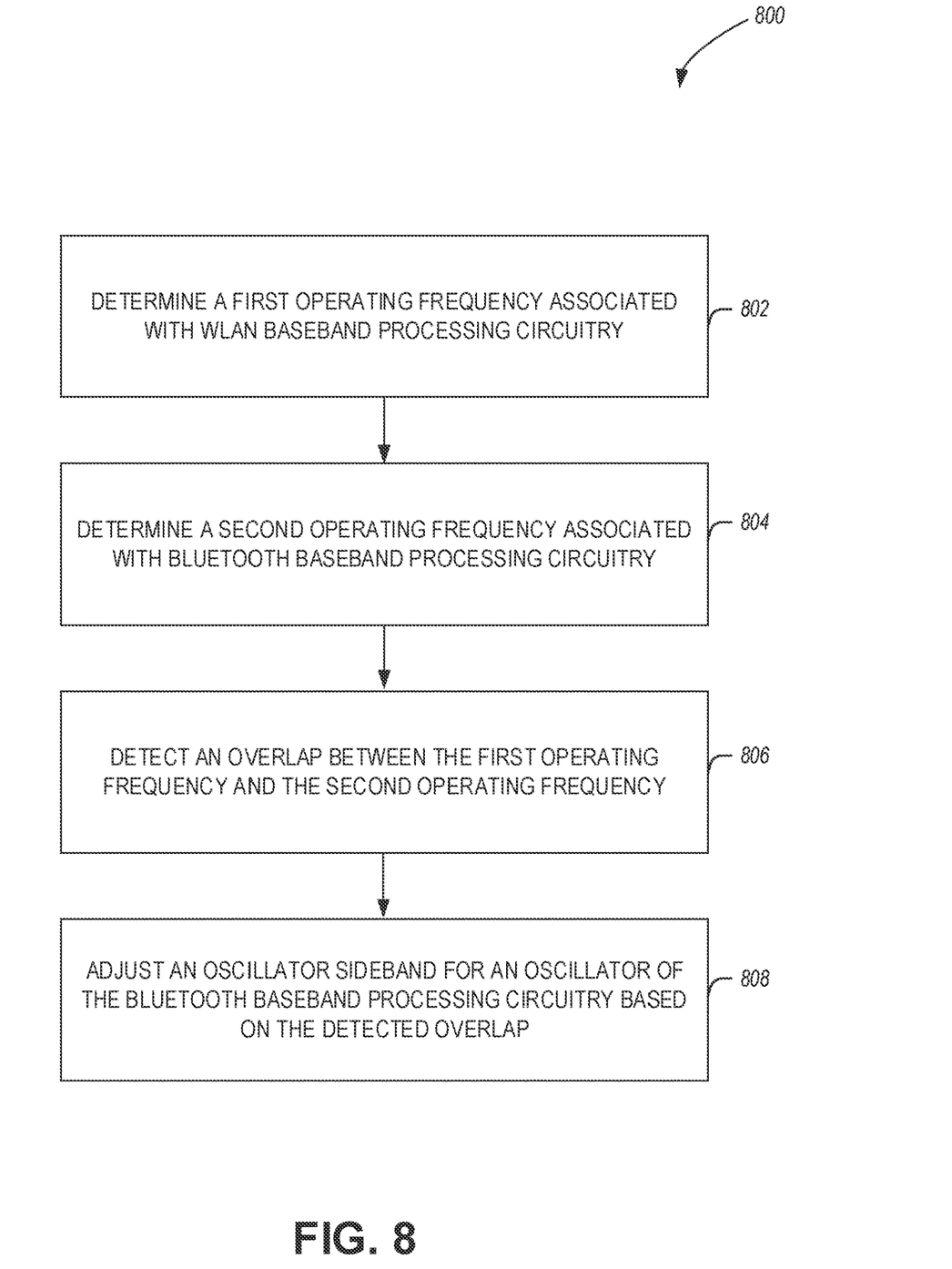
FIG. 8 is a flow diagram of a method for mitigating oscillator leakage associated with BT-WLAN coexistence, in accordance with some embodiments.

FIG. 8 is a flow diagram of method 800 for mitigating oscillator leakage associated with BT-WLAN coexistence, in accordance with some embodiments. Referring to FIG. 8, method 800 can be performed by, e.g., the oscillator control circuit 710 of FIG. 7. At operation 802, determining a first operating frequency associated with WLAN baseband processing circuitry is determined. For example, the oscillator control circuit 710 determines a first operating frequency 714 associated with the WLAN baseband processing circuitry (e.g., the WLAN PHY 702). At operation 804, a second operating frequency associated with a Bluetooth baseband processing circuitry is determined. For example, the oscillator control circuit 710 determines a second operating frequency 716 associated with the BT baseband processing circuitry (e.g., the BT PHY 704). At operation 806, an overlap between the first operating frequency and the second operating frequency is detected. For example, the oscillator control circuit 710 detects an overlap between the first operating frequency 714 and the second operating frequency 716. At operation 808, an oscillator sideband for an oscillator of the Bluetooth baseband processing circuitry is adjusted based on the detected overlap to mitigate interference between signals generated by the oscillator of the BT baseband processing circuitry and the first operating frequency associated with the WLAN baseband processing circuitry. For example, the oscillator control circuit 710 uses the allowed separation information 712 (which indicates allowed overlap, or allowed separation indication, between different WLAN and BT operating frequencies) and determines whether the detected overlap between the first operating frequency 714 and the second operating frequency 716 is higher than the allowed overlap. If the detected overlap is higher than the allowed separation indication, the oscillator control circuit 710 generates the BT LO control command 718 to adjust the operating sideband of the BT LO 708 from a high sideband to a low sideband.

If the detected overlap is lower than the allowed separation indication (or there is no overlap), a second oscillator control command for communication to the oscillator of the Bluetooth baseband processing circuitry is generated. The second oscillator control command causes the BT LO 708 to switch from operating in the low sideband of the second operating frequency to operating in the high sideband of the second operating frequency. In some aspects, the low sideband and the high sideband are respectively offset by 1 MHz below and 1 MHz above the second operating frequency.

Figure 9:
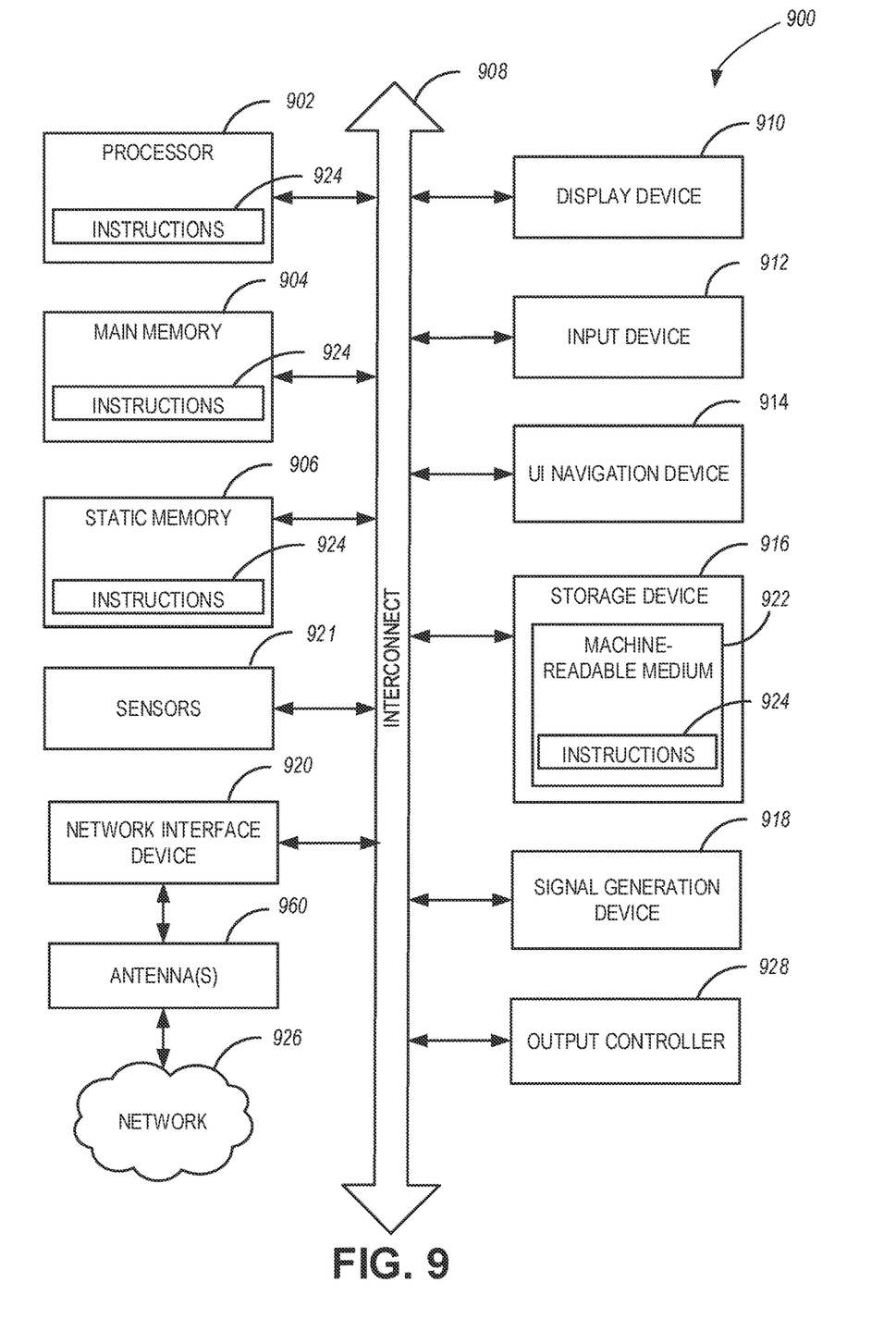
FIG. 9 illustrates a block diagram of an example machine upon which any one or more of the operations/techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, machine 900 may operate in the capacity of a server machine, a client machine, or both in server-client network environments. In an example, the machine 900 may act as a peer machine in a peer-to-peer (P2P) (or other distributed) network environment. The machine 900 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 900 may include a hardware processor 902 (e.g., a central processing unit (CPU), a graphics processing unit (GPU), a hardware processor core, or any combination thereof), a main memory 904, and a static memory 906, some or all of which may communicate with each other via an interlink (e.g., bus) 908.

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912, and UI navigation device 914 may be a touch screen display. The machine 900 may additionally include a storage device (e.g., drive unit or another mass storage device) 916, a signal generation device 918 (e.g., a speaker), a network interface device 920, and one or more sensors 921, such as a global positioning system (GPS) sensor, compass, accelerometer, or other sensors. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 902 and/or instructions 924 may comprise processing circuitry and/or transceiver circuitry.

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 922 is illustrated as a single medium, the term "machine-readable medium" may include a single medium or multiple media (e.g., a centralized or distributed database, and/or associated caches and servers) configured to store one or more instructions 924.

An apparatus of the machine 900 may be one or more of a hardware processor 902 (e.g., a central processing unit (CPU), a graphics processing unit (GPU), a hardware processor core, or any combination thereof), a main memory 904 and a static memory 906, one or more sensors 921, a network interface device 920, antennas 960, a display device 910, an input device 912, a UI navigation device 914, a storage device 916, instructions 924, a signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding, or carrying instructions for execution by the machine 900, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

Additional Notes and Examples

Example 1 is a wireless device comprising: first wireless baseband processing circuitry (WBPC), the first WBPC configured to process signals for transmission or reception using a first wireless technology; second WBPC, the second WBPC configured to process signals for transmission or reception using a second wireless technology; and an oscillator control circuit configured to determine a first operating frequency associated with the first WBPC; determine a second operating frequency associated with the second WBPC; detect overlap between the first operating frequency and the second operating frequency; and adjust an oscillator sideband for an oscillator of the second WBPC based on the detected overlap to mitigate interference between signals generated by the oscillator of the second WBPC and the first operating frequency associated with the first WBPC.

In Example 2, the subject matter of Example 1 includes, wherein the oscillator control circuit is within the first WBPC or the second WBPC, and the oscillator control circuit is configured to retrieve an allowed separation indication providing an allowed overlap between the first operating frequency and the second operating frequency.

In Example 3, the subject matter of Example 2 includes, wherein the oscillator control circuit is configured to adjust the oscillator sideband for the oscillator of the second WBPC when the detected overlap is higher than the allowed separation indication.

In Example 4, the subject matter of Examples 1-3 includes, wherein to adjust the oscillator sideband, the oscillator control circuit is configured to generate an oscillator control command for communication to the oscillator of the second WBPC, the oscillator control command causing the oscillator of the second WBPC to switch from operating in a high sideband of the second operating frequency to operating in a low sideband of the second operating frequency.

In Example 5, the subject matter of Example 4 includes, wherein the oscillator control circuit is configured to detect the first operating frequency and the second operating frequency are non-overlapping; and generate a second oscillator control command for communication to the oscillator of the second WBPC, the second oscillator control command causing the oscillator of the second WBPC to switch from operating in the low sideband of the second operating frequency to operating in the high sideband of the second operating frequency.

In Example 6, the subject matter of Examples 1-5 includes, wherein the first wireless technology is based on a Wireless Local Area Network (WLAN) protocol standard and the first WBPC is WLAN baseband processing circuitry.

In Example 7, the subject matter of Example 6 includes, wherein the second wireless technology is based on a Bluetooth protocol standard and the second WBPC is Bluetooth baseband processing circuitry.

In Example 8, the subject matter of Example 7 includes, wherein the first operating frequency is a frequency associated with a Bluetooth advertising channel.

In Example 9, the subject matter of Examples 7-8 includes, MHz.

Example 10 is a method for mitigating interference between coexisting Bluetooth baseband processing circuitry and Wireless Local Area Network (WLAN) baseband processing circuitry, the method comprising: determining a first operating frequency associated with the WLAN baseband processing circuitry; determining a second operating frequency associated with the Bluetooth baseband processing circuitry; detecting an overlap between the first operating frequency and the second operating frequency; and adjusting an oscillator sideband for an oscillator of the Bluetooth baseband processing circuitry based on the detected overlap to mitigate interference between signals generated by the oscillator of the Bluetooth baseband processing circuitry and the first operating frequency associated with the WLAN baseband processing circuitry.

In Example 11, the subject matter of Example 10 includes, retrieving an allowed separation indication providing an allowed overlap between the first operating frequency and the second operating frequency.

In Example 12, the subject matter of Example 11 includes, adjusting the oscillator sideband for the oscillator of the Bluetooth baseband processing circuitry when the detected overlap is higher than the allowed separation indication.

In Example 13, the subject matter of Examples 10-12 includes, wherein adjusting the oscillator sideband further comprises: generating an oscillator control command for communication to the oscillator of the Bluetooth baseband processing circuitry, the oscillator control command causing the oscillator of the Bluetooth baseband processing circuitry to switch from operating in a high sideband of the second operating frequency to operating in a low sideband of the second operating frequency.

In Example 14, the subject matter of Example 13 includes, detecting the first operating frequency and the second operating frequency are non-overlapping; and generating a second oscillator control command for communication to the oscillator of the Bluetooth baseband processing circuitry, the second oscillator control command causing the oscillator of the Bluetooth baseband processing circuitry to switch from operating in the low sideband of the second operating frequency to operating in the high sideband of the second operating frequency.

In Example 15, the subject matter of Examples 13-14 includes, MHz above the second operating frequency.

Example 16 is a non-transitory computer-readable storage medium that stores instructions for execution by one or more processors of a wireless device with coexisting Bluetooth baseband processing circuitry and Wireless Local Area Network (WLAN) baseband processing circuitry, the instructions to cause the wireless device to perform operations comprising: determining a first operating frequency associated with the WLAN baseband processing circuitry; determining a second operating frequency associated with the Bluetooth baseband processing circuitry; detecting an overlap between the first operating frequency and the second operating frequency; and adjusting an oscillator sideband for an oscillator of the Bluetooth baseband processing circuitry based on the detected overlap to mitigate interference between signals generated by the oscillator of the Bluetooth baseband processing circuitry and the first operating frequency associated with the WLAN baseband processing circuitry.

In Example 17, the subject matter of Example 16 includes, wherein executing the instructions further causes the wireless device to perform operations comprising: retrieving an allowed separation indication providing an allowed overlap between the first operating frequency and the second operating frequency.

In Example 18, the subject matter of Example 17 includes, wherein executing the instructions further causes the wireless device to perform operations comprising: adjusting the oscillator sideband for the oscillator of the Bluetooth baseband processing circuitry when the detected overlap is higher than the allowed separation indication.

In Example 19, the subject matter of Examples 16-18 includes, wherein to adjust the oscillator sideband, the instructions further cause the wireless device to perform operations comprising: generating an oscillator control command for communication to the oscillator of the Bluetooth baseband processing circuitry, the oscillator control command causing the oscillator of the Bluetooth baseband processing circuitry to switch from operating in a high sideband of the second operating frequency to operating in a low sideband of the second operating frequency.

In Example 20, the subject matter of Example 19 includes, wherein executing the instructions further causes the wireless device to perform operations comprising: detecting the first operating frequency and the second operating frequency are non-overlapping; and generating a second oscillator control command for communication to the oscillator of the Bluetooth baseband processing circuitry, the second oscillator control command causing the oscillator of the Bluetooth baseband processing circuitry to switch from operating in the low sideband of the second operating frequency to operating in the high sideband of the second operating frequency.

Example 21 is at least one machine-readable medium including instructions that, when executed by processing circuitry, cause the processing circuitry to perform operations to implement any of Examples 1-20.

Example 22 is an apparatus comprising means to implement of any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A wireless device comprising:
   first wireless baseband processing circuitry (WBPC), the first WBPC configured to process signals for transmission or reception using a first wireless technology;
   second WBPC, the second WBPC configured to process signals for transmission or reception using a second wireless technology; and
   an oscillator control circuit configured to:
     determine a first operating frequency associated with the first WBPC;
     determine a second operating frequency associated with the second WBPC;
     detect overlap between the first operating frequency and the second operating frequency; and
     adjust an oscillator sideband for an oscillator of the second WBPC based on the detected overlap to mitigate interference between signals generated by the oscillator of the second WBPC and the first operating frequency associated with the first WBPC.

2. The wireless device of claim 1, wherein the oscillator control circuit is within the first WBPC or the second WBPC, and the oscillator control circuit is configured to:
   retrieve an allowed separation indication providing an allowed overlap between the first operating frequency and the second operating frequency.

3. The wireless device of claim 2, wherein the oscillator control circuit is configured to:
   adjust the oscillator sideband for the oscillator of the second WBPC when the detected overlap is higher than the allowed separation indication.

4. The wireless device of claim 1, wherein to adjust the oscillator sideband, the oscillator control circuit is configured to:
   generate an oscillator control command for communication to the oscillator of the second WBPC, the oscillator control command causing the oscillator of the second WBPC to switch from operating in a high sideband of the second operating frequency to operating in a low sideband of the second operating frequency.

5. The wireless device of claim 4, wherein the oscillator control circuit is configured to:
   detect the first operating frequency and the second operating frequency are non-overlapping; and
   generate a second oscillator control command for communication to the oscillator of the second WBPC, the second oscillator control command causing the oscillator of the second WBPC to switch from operating in the low sideband of the second operating frequency to operating in the high sideband of the second operating frequency.

6. The wireless device of claim 1, wherein the first wireless technology is based on a Wireless Local Area Network (WLAN) protocol standard and the first WBPC is WLAN baseband processing circuitry.

7. The wireless device of claim 6, wherein the second wireless technology is based on a Bluetooth protocol standard and the second WBPC is Bluetooth baseband processing circuitry.

8. The wireless device of claim 7, wherein the first operating frequency is a frequency associated with a Bluetooth advertising channel.

9. The wireless device of claim 7, wherein the second operating frequency is an operating frequency range associated with a Wi-Fi channel, and wherein the operating frequency range is associated with one of Wi-Fi channel 1 (CH1) centered at 2412 MHz, Wi-Fi CH6 centered at 2437 MHz, and Wi-Fi CH11 centered at 2462 MHz.

10. A method for mitigating interference between coexisting Bluetooth baseband processing circuitry and Wireless Local Area Network (WLAN) baseband processing circuitry, the method comprising:
    determining a first operating frequency associated with the WLAN baseband processing circuitry;
    determining a second operating frequency associated with the Bluetooth baseband processing circuitry;
    detecting an overlap between the first operating frequency and the second operating frequency; and
    adjusting an oscillator sideband for an oscillator of the Bluetooth baseband processing circuitry based on the detected overlap to mitigate interference between signals generated by the oscillator of the Bluetooth baseband processing circuitry and the first operating frequency associated with the WLAN baseband processing circuitry.

11. The method of claim 10, further comprising:
    retrieving an allowed separation indication providing an allowed overlap between the first operating frequency and the second operating frequency.

12. The method of claim 11, further comprising:
adjusting the oscillator sideband for the oscillator of the Bluetooth baseband processing circuitry when the detected overlap is higher than the allowed separation indication.

13. The method of claim 10, wherein adjusting the oscillator sideband further comprises:
generating an oscillator control command for communication to the oscillator of the Bluetooth baseband processing circuitry, the oscillator control command causing the oscillator of the Bluetooth baseband processing circuitry to switch from operating in a high sideband of the second operating frequency to operating in a low sideband of the second operating frequency.

14. The method of claim 13, further comprising:
detecting the first operating frequency and the second operating frequency are non-overlapping; and
generating a second oscillator control command for communication to the oscillator of the Bluetooth baseband processing circuitry, the second oscillator control command causing the oscillator of the Bluetooth baseband processing circuitry to switch from operating in the low sideband of the second operating frequency to operating in the high sideband of the second operating frequency.

15. The method of claim 13, wherein the low sideband and the high sideband are respectively offset by 1 MHz below and 1 MHz above the second operating frequency.

16. A non-transitory computer-readable storage medium that stores instructions for execution by one or more processors of a wireless device with coexisting Bluetooth baseband processing circuitry and Wireless Local Area Network (WLAN) baseband processing circuitry, the instructions to cause the wireless device to perform operations comprising:
determining a first operating frequency associated with the WLAN baseband processing circuitry;
determining a second operating frequency associated with the Bluetooth baseband processing circuitry;
detecting an overlap between the first operating frequency and the second operating frequency; and
adjusting an oscillator sideband for an oscillator of the Bluetooth baseband processing circuitry based on the detected overlap to mitigate interference between signals generated by the oscillator of the Bluetooth baseband processing circuitry and the first operating frequency associated with the WLAN baseband processing circuitry.

17. The non-transitory computer-readable storage medium of claim 16, wherein executing the instructions further causes the wireless device to perform operations comprising:
retrieving an allowed separation indication providing an allowed overlap between the first operating frequency and the second operating frequency.

18. The non-transitory computer-readable storage medium of claim 17, wherein executing the instructions further causes the wireless device to perform operations comprising:
adjusting the oscillator sideband for the oscillator of the Bluetooth baseband processing circuitry when the detected overlap is higher than the allowed separation indication.

19. The non-transitory computer-readable storage medium of claim 16, wherein to adjust the oscillator sideband, the instructions further cause the wireless device to perform operations comprising:
generating an oscillator control command for communication to the oscillator of the Bluetooth baseband processing circuitry, the oscillator control command causing the oscillator of the Bluetooth baseband processing circuitry to switch from operating in a high sideband of the second operating frequency to operating in a low sideband of the second operating frequency.

20. The non-transitory computer-readable storage medium of claim 19, wherein executing the instructions further causes the wireless device to perform operations comprising:
detecting the first operating frequency and the second operating frequency are non-overlapping; and
generating a second oscillator control command for communication to the oscillator of the Bluetooth baseband processing circuitry, the second oscillator control command causing the oscillator of the Bluetooth baseband processing circuitry to switch from operating in the low sideband of the second operating frequency to operating in the high sideband of the second operating frequency.

* * * * *